United States Patent
Helal et al.

(10) Patent No.: US 12,491,493 B1
(45) Date of Patent: Dec. 9, 2025

(54) AMINE APPENDED BIMETALLIC METAL-ORGANIC FRAMEWORK (MOF-74) FOR CARBON DIOXIDE CAPTURE AND METHOD OF PREPARATION THEREOF

(71) Applicant: KING FAHD UNIVERSITY OF PETROLEUM AND MINERALS, Dhahran (SA)

(72) Inventors: Aasif Helal, Dhahran (SA); Rodynah Abdullatif Alabdulhadi, Dhahran (SA)

(73) Assignee: KING FAHD UNIVERSITY OF PETROLEUM AND MINERALS, Dhahran (SA)

( * ) Notice: Subject to any disclaimer, the term of this patent is extended or adjusted under 35 U.S.C. 154(b) by 0 days.

(21) Appl. No.: 19/188,376

(22) Filed: Apr. 24, 2025

Related U.S. Application Data

(60) Provisional application No. 63/768,097, filed on Mar. 6, 2025.

(51) Int. Cl.
| | |
|---|---|
| *B01J 20/22* | (2006.01) |
| *B01D 53/04* | (2006.01) |
| *B01J 20/28* | (2006.01) |
| *B01J 20/30* | (2006.01) |
| *C07F 3/08* | (2006.01) |

(52) U.S. Cl.
CPC ............ *B01J 20/226* (2013.01); *B01D 53/04* (2013.01); *B01J 20/28007* (2013.01); *B01J 20/28019* (2013.01); *B01J 20/3071* (2013.01); *B01J 20/3078* (2013.01); *C07F 3/08* (2013.01); *B01D 2253/10* (2013.01); *B01D 2253/204* (2013.01); *B01D 2253/34* (2013.01); *B01J 2220/42* (2013.01)

(58) Field of Classification Search
CPC ............. B01J 20/226; B01J 20/28007; B01D 2253/204; C07F 3/08
See application file for complete search history.

(56) References Cited

U.S. PATENT DOCUMENTS

2016/0158691 A1* 6/2016 Kortunov ............. B01D 53/047
 423/228
2022/0401915 A1 12/2022 Koh et al.

FOREIGN PATENT DOCUMENTS

| CN | 111375274 B | 10/2022 |
|---|---|---|
| CN | 115318097 A | 11/2022 |

(Continued)

OTHER PUBLICATIONS

Kim, et al. "Synthesis of high-quality Mg-MOF-74 thin films via vapor-assisted crystallization." ACS Applied Materials & Interfaces 13.29 (2021): 35223-35231 (Year: 2021).*

(Continued)

*Primary Examiner* — Anthony J Zimmer
*Assistant Examiner* — Eric Scott Sherman
(74) *Attorney, Agent, or Firm* — Oblon, McClelland, Maier & Neustadt, L.L.P.

(57) ABSTRACT

A metal-organic framework (MOF) includes cadmium, magnesium, linking units of 2,5-dihydroxyterephthalic acid complexed with cadmium and magnesium, and units of guanidine in an amount of 1 to 25 percent by weight (wt. %) based on the total weight of the MOF. The units of guanidine are reacted with the linking units of 2,5-dihydroxyterephthalic acid. The MOF is in the shape of spherical particles with a longest dimension of 50 to 250 nanometers (nm).

14 Claims, 11 Drawing Sheets

(56) References Cited

FOREIGN PATENT DOCUMENTS

| | | |
|---|---|---|
| CN | 117736455 A | 3/2024 |
| WO | 2022/251134 A1 | 12/2022 |

OTHER PUBLICATIONS

Xiaoying Lin et al., "Amino-modified Mg-MOF-74: Synthesis, characterization and $CO_2$ adsorption performance", Environmental Engineering Research, vol. 21, Issue 1, Feb. 3, 2022, 10 pages.
Robert M. Marti et al., "$CO_2$ Dynamics in Pure and Mixed-Metal MOFs with Open Metal Sites", The Journal of Physical Chemistry, vol. 121, Issue 46, Sep. 22, 2017, pp. 25778-25787.

\* cited by examiner

AMINE APPENDED BIMETALLIC METAL-ORGANIC FRAMEWORK (MOF-74) FOR CARBON DIOXIDE CAPTURE AND METHOD OF PREPARATION THEREOF

CROSS REFERENCE TO RELATED APPLICATION

This application claims the benefit of U.S. Provisional Application No. 63/768,097, filed Mar. 6, 2025, which is incorporated herein by reference in its entirety.

STATEMENT OF ACKNOWLEDGEMENT

Support provided by King Fahd University of Petroleum and Minerals, Saudi Arabia, through Project INHE2306 is gratefully acknowledged.

BACKGROUND

Technical Field

The present disclosure is directed towards a metal-organic framework (MOF), and more particularly, an amine appended bimetallic MOF-74 including linking units of 2,5-dihydroxyterephthalic acid complexed with cadmium and magnesium (CdMg-MOF-74) for carbon dioxide ($CO_2$) capture.

Description of Related Art

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly nor impliedly admitted as prior art against the present disclosure.

Rapid industrialization and technological advancements of the 21$^{st}$ century have led to a rise in anthropogenic carbon dioxide ($CO_2$) emissions, contributing to global warming. This global environmental challenge has drawn widespread attention from the scientific community, spurring research efforts focused on developing sustainable and effective strategies to manage $CO_2$ emissions in the pursuit of carbon neutrality.

Among various strategies explored, design and synthesis of materials capable of selectively capturing and storing $CO_2$ has emerged. Metal-organic frameworks (MOFs), in particular, have gained traction due to their high surface areas, tunable pore structures, and elevated adsorption capabilities. Tailoring the surface chemistry of MOFs, especially through functionalization of the organic linkers or metal centers, has been shown to enhance $CO_2$ uptake and improve stability under humid conditions.

Traditional $CO_2$ sequestration methods, such as geological storage and ocean fertilization, have several limitations. These approaches carry risks of $CO_2$ leakage over time and potential ecological disturbances. They also involve large costs and require large-scale land and/or ocean areas, making them less practical for widespread implementation compared to more innovative technologies like MOFs.

There remains a need to develop metal-organic frameworks which are cost effective and provide increased carbon dioxide sequestration properties. Accordingly, it is an object of the present disclosure to provide an amine-appended MOF that may circumvent drawbacks, such as complexity, high cost, lack of multi-phase integration, and nanoscale precision, of materials known in the art.

SUMMARY

In an exemplary embodiment, a metal-organic framework (MOF) is described. The MOF includes cadmium, magnesium, linking units of 2,5-dihydroxyterephthalic acid complexed with cadmium and magnesium, and units of guanidine in an amount of 1 to 25 percent by weight (wt. %) based on a total weight of the MOF. The units of guanidine are reacted with the linking units of 2,5-dihydroxyterephthalic acid. The MOF is in the shape of spherical particles with a longest dimension of 50 to 250 nanometers (nm).

In some embodiments, the units of guanidine form amine groups on an outer surface of the MOF.

In some embodiments, the MOF includes units of guanidine in an amount of 1 to 3 wt. % based on a total weight of the MOF.

In some embodiments, the MOF includes units of guanidine in an amount of 5 to 7 wt. % based on a total weight of the MOF.

In some embodiments, the MOF includes units of guanidine in an amount of 8 to 12 wt. % based on a total weight of the MOF.

In some embodiments, the MOF includes units of guanidine in an amount of 18 to 22 wt. % based on a total weight of the MOF.

In some embodiments, the MOF has a carbon dioxide ($CO_2$) uptake value of 100 to 120 cubic centimeters per gram (cc/g) at a pressure of 760 torr and a temperature of 273 kelvin (K).

In some embodiments, the MOF has a $CO_2$ uptake value of 70 to 90 cc/g at a pressure of 760 torr and a temperature of 298 K.

In some embodiments, the MOF has a nitrogen ($N_2$) uptake value of 0 cc/g at a pressure of 760 torr and a temperature of 273 K.

In some embodiments, the MOF has an $N_2$ uptake value of 0 cc/g at a pressure of 760 torr and a temperature of 298 K.

In some embodiments, the units of guanidine act as Lewis acids.

In another embodiment, a method of $CO_2$ sequestration is described. The method includes flowing $CO_2$ over the MOF to adsorb the $CO_2$ onto the MOF.

In some embodiments, the $CO_2$ is adsorbed on amines of the units of guanidine.

In some embodiments, the MOF has a d-spacing of 0.235 to 0.245 nm and 0.260 to 0.265 nm.

In some embodiments, the MOF has more acid sites than the same MOF without the units of guanidine.

In some embodiments, the spherical particles are layered.

In another embodiment, a method of making the MOF is described. The method includes dissolving a 2,5-dihydroxyterephthalic acid, a cadmium salt, and a magnesium salt in a solvent mixture to form a first solution, sonicating the first solution for 5 to 15 minutes (min), and heating the first solution to a temperature of 120 to 140 degrees Celsius (° C.) for 20 to 28 hours (h) to form a first product. The method further includes washing and drying the first product, mixing the first product with a guanidine salt in a polar organic solvent to form a second mixture, refluxing the second mixture at a temperature of 50 to 70° C. for 20 to 28 h to form a second product, and washing and drying the second product to form the MOF.

In some embodiments, the solvent mixture has a volumetric ratio of 15:1:1 of dimethylformamide to ethanol to water.

In some embodiments, a molar ratio of cadmium salt to the magnesium salt is 1:2 to 2:1.

In some embodiments, the guanidine salt is a guanidine hydrochloride.

The foregoing general description of the illustrative embodiments and the following detailed description thereof are merely exemplary aspects of the teachings of this disclosure and are not restrictive.

BRIEF DESCRIPTION OF THE DRAWINGS

A more complete appreciation of this disclosure and many of the attendant advantages thereof will be readily obtained as the same becomes better understood by reference to the following detailed description when considered in connection with the accompanying drawings, wherein.

DETAILED DESCRIPTION

Figure 1:
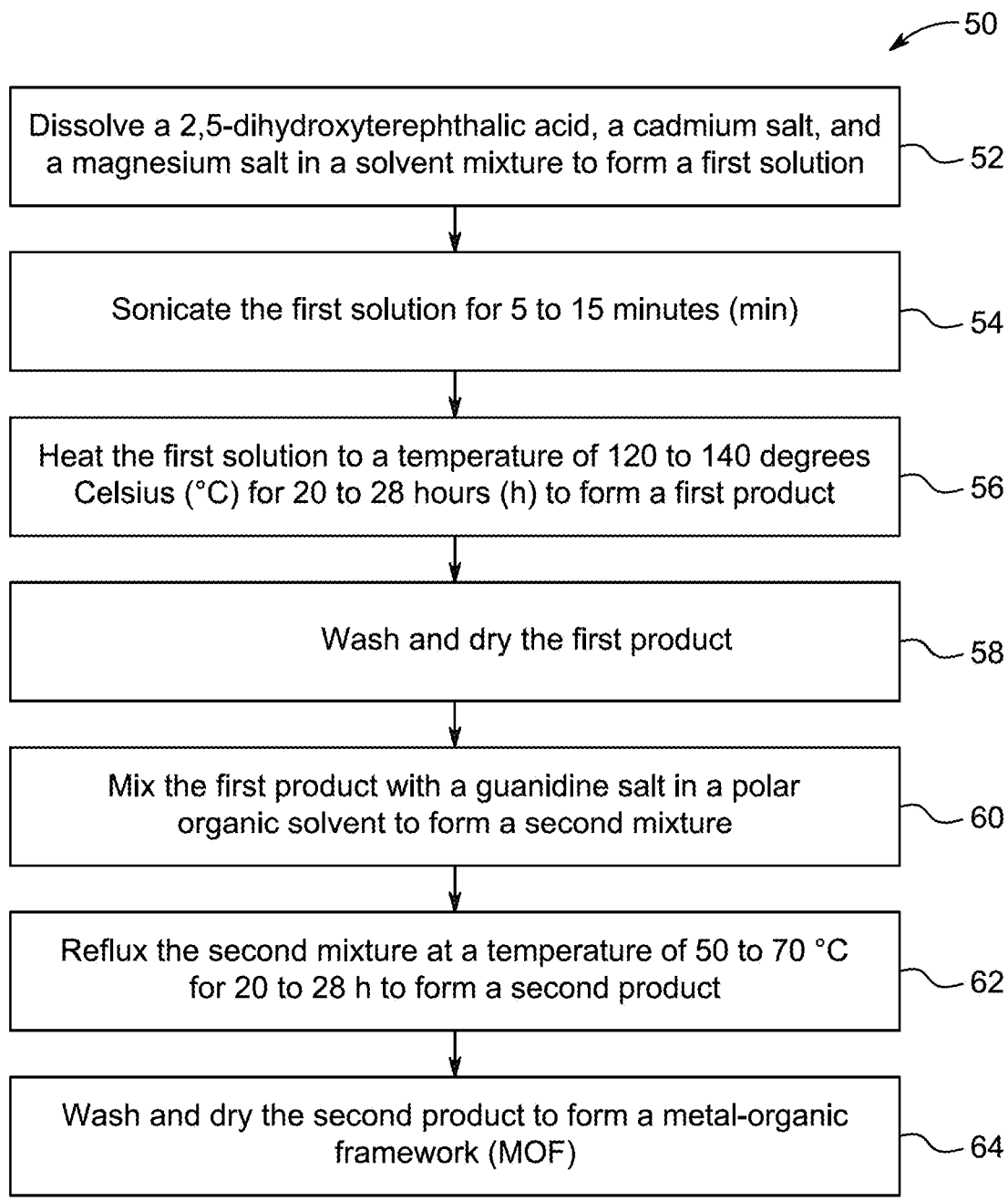
FIG. 1 is a flow chart of a method of forming an amine-appended bimetallic metal-organic framework (MOF-74), including linking units of 2,5-dihydroxyterephthalic acid complexed with cadmium and magnesium (CdMg-MOF-74), according to certain embodiments.

When describing the present disclosure, the terms used are to be construed in accordance with the following definitions, unless a context dictates otherwise.

Embodiments of the present invention will now be described more fully hereinafter with reference to the accompanying drawings wherever applicable, in that some, but not all, embodiments of the disclosure are shown.

In the drawings, like reference numerals will be used to designate identical or corresponding parts throughout the several views. Further, as used herein, the words "a," "an," and the like generally carry a meaning of "one or more," unless stated otherwise.

Furthermore, the terms "approximately," "approximate," "about," and similar terms generally refer to ranges that include the identified value within a margin of 20%, 10%, or preferably 5%, and any values therebetween.

As used herein, the term "room temperature" refers to a temperature range of 25±3 degrees Celsius (° C.) in the present disclosure.

As used herein, the term "ultrasonication" or "sonication" refers to a process in which sound waves are used to agitate particles in a solution.

As used herein, the term "nanoparticles (NPs)" refers to particles having a particle size of 1 to 500 nanometers (nm) within the scope of the present invention.

As used herein, the term "nanocomposite" refers to a composite material that has at least one component with a grain size measured in nanometers.

As used herein, the term "nanohybrid composite" refers to a material that combines nanomaterials (such as nanoparticles, nanotubes, nanofibers, a combination thereof, and the like) with another material, typically a polymer, metal, and/or ceramic, to form a composite structure. The nanomaterials are typically incorporated at the nanoscale level to enhance the properties of the base material, such as improving strength, conductivity, or flexibility, while maintaining the advantages of both components. The resulting nanohybrid composite exhibits properties that are different to the individual materials alone.

As used herein, the term "metal-organic framework (MOF)" refers to a class of porous crystalline materials composed of metal ions or clusters coordinated to organic ligands, forming one-, two-, or three-dimensional structures with high surface area and tunable porosity.

As used herein, the term "Lewis acid" refers to a chemical species that can accept an electron pair from a Lewis base to form a coordinate covalent bond, often involving metal centers capable of interacting with electron-rich molecules.

As used herein, the term "carbon dioxide ($CO_2$) uptake" refers to the amount of $CO_2$ gas that a material can adsorb or capture under specific conditions, typically expressed in units such as mmol/g or $cm^3$/g at a given temperature and pressure.

As used herein, the term "nitrogen ($N_2$) uptake" refers to the amount of nitrogen gas that a material can adsorb under defined conditions, serving as an indicator of surface area or porosity in gas adsorption studies.

As used herein, the term "adsorption" refers to the process by which molecules, ions, or particles from a fluid (typically a liquid or gas) adhere to the surface of a solid material, known as the adsorbent. An aspect of adsorption is that the substance remains on the surface of the adsorbent rather than being absorbed into the bulk material.

A weight percent of a component, unless specifically stated to the contrary, is based on the total weight of the formulation or composition in which the component is included. For example, if a particular element or component in a composition or article is said to have 5 wt. %, it is understood that this percentage is in relation to a total compositional percentage of 100%.

The present disclosure is intended to include all hydration states of a given compound or formula, unless otherwise noted or when heating a material.

In addition, the present disclosure is intended to include all isotopes of atoms occurring in the present compounds and complexes. Isotopes include those atoms having the same atomic number but different mass numbers. By way of general example, and without limitation, isotopes of hydrogen include deuterium and tritium, isotopes of carbon include 13C and 14C, and isotopes of nitrogen include 14N and 15N. Isotopes of oxygen include 16O, 17O, and 18O. Isotopically-labeled compounds of the disclosure may generally be prepared by conventional techniques known to those skilled in the art or by processes analogous to those described herein, using an appropriate isotopically-labeled reagent in place of the non-labeled reagent otherwise employed.

Aspects of the present disclosure are directed to an amine appended bimetallic MOF-74, including linking units of 2,5-dihydroxyterephthalic acid complexed with cadmium and magnesium for $CO_2$ capture.

A metal-organic framework (MOF) is described. The MOF includes cadmium, magnesium, linking units of 2,5-dihydroxyterephthalic acid complexed with cadmium and magnesium, and units of guanidine in an amount of 1 to 25 percent by weight (wt. %) based on the total weight of the MOF. In some embodiments, the linking units of 2,5-dihydroxyterephthalic acid are complexed with cadmium and magnesium through reacted carboxylic acid functional groups. In other embodiments, the linking units of 2,5-dihydroxyterephthalic acid are complexed with cadmium and magnesium through reacted hydroxyl functional groups. MOFs are materials comprising metal nodes linked by organic ligands. Their porous structure and tunable pore size properties make MOFs good candidates for capturing and storing gases like $CO_2$. Their high surface area and porosity enable $CO_2$ adsorption, while their lightweight nature allows for higher filler loading in composites without adding a great amount of weight. MOFs can be functionalized to enhance $CO_2$ selectivity and improve capture efficiency, making them promising candidates for $CO_2$ sequestration. In some embodiments, the MOF may include, but is not limited to, MOF-74, UiO-66, ZIF-8, MOF-5, MIL-101, HKUST-1, IRMOF-1, Cu-BTC, MOF-177, MIL-53, CPO-27, NOTT-101, SIFSIX-3, PCN-250, Co-M, a combination thereof, and the like. In a preferred embodiment, the MOF is MOF-74.

MOF-74 is an MOF composed of metal centers such as magnesium, cobalt, or nickel linked to 2,5-dihydroxyterephthalic acid. The structure of MOF-74 features one-dimensional channels with a high surface area, making it effective for gas storage, separation, and $CO_2$ capture due to its ability to selectively adsorb gases, particularly $CO_2$, through open metal sites. MOF-74 and its analogues have been widely studied as effective adsorbents for $CO_2$, even in the presence of moisture. Specifically, Mg-MOF-74, with its open metal sites and defined framework, has demonstrated high selectivity and capacity for $CO_2$ adsorption. As research in this area has progressed, focus has shifted from maximizing surface area to engineering the pore environment and surface chemistry to further enhance gas adsorption behavior.

Recent innovations have introduced incorporation of bimetallic elements to improve framework stability and $CO_2$ affinity, and post-synthetic functionalization with amine groups to introduce chemically active sites for selective $CO_2$ binding to improve the performance of MOF-74 materials.

The units of guanidine are reacted with the linking units of 2,5-dihydroxyterephthalic acid. Guanidine is a nitrogen-rich compound with amino-like characteristics, consisting of a central carbon connected to three nitrogen atoms in a flat arrangement. MOFs functionalized with guanidine may have improved stability, catalysis, and selectivity by taking advantage of the basicity and coordination potential of guanidine's nitrogen atoms. In some embodiments, the units of guanidine are reacted with hydroxyl functional groups in the linking units of 2,5-dihydroxyterephthalic acid. In other embodiments, the units of guanidine are reacted with carboxylic acid functional groups of the linking units of 2,5-dihydroxyterephthalic acid. In one embodiment, the units of guanidine are reacted with hydroxyl functional groups and carboxylic acid functional groups in the linking units of 2,5-dihydroxyterephthalic acid.

In some embodiments, the units of guanidine reacted with the linking units of 2,5-dihydroxyterephthalic acid form amine groups on an outer surface of the MOF. In some embodiments, at least 10%, preferably at least 20%, preferably at least 30%, preferably at least 40%, preferably at least 50%, preferably at least 60%, preferably at least 70%, preferably at least 80%, preferably at least 90%, and preferably at least 95% of the outer surface of the MOF is covered in amine groups from the reacted units of guanidine based on a total surface area of the MOF In one embodiment, the reacted units of guanidine act as Lewis acids. In some embodiments, the amine groups of the reacted units of guanidine are protonated and act as Lewis acids. Guanidine units can interact with electron-rich molecules which enhances the ability of MOF to facilitate specific chemical reactions. In an embodiment, the MOF has more acid sites than the same MOF without the units of guanidine. In some embodiments, acidic sites refer to the metal centers or functional groups within the MOF structure that can act as Lewis acids.

The MOF includes units of guanidine in an amount of 1 to 25 percent by weight (wt. %), preferably 2 to 24 wt. %, preferably 3 to 23 wt. %, preferably 4 to 22 wt. %, preferably 5 to 21 wt. %, preferably 6 to 20 wt. %, preferably 7 to 19 wt. %, preferably 8 to 18 wt. %, preferably 9 to 17 wt. %, preferably 10 to 16 wt. %, preferably 11 to 15 wt. %, and preferably 12 to 14 wt. % based on a total weight of the MOF.

In some embodiments, the MOF includes units of guanidine in an amount of 1 to 3 wt. %, preferably 1.1 to 2.9 wt. %, preferably 1.2 to 2.8 wt. %, preferably 1.3 to 2.7 wt. %, preferably 1.4 to 2.6 wt. %, preferably 1.5 to 2.5 wt. %, preferably 1.6 to 2.4 wt. %, preferably 1.7 to 2.3 wt. %, preferably 1.8 to 2.2 wt. %, more preferably 1.9 to 2.1 wt. %, and yet more preferably about 2 wt. % based on a total weight of the MOF. In a preferred embodiment, the MOF includes units of guanidine in an amount of 2 wt. % based on a total weight of the MOF.

In some embodiments, the MOF includes units of guanidine in an amount of 5 to 7 wt. %, preferably 5.1 to 6.9 wt. %, preferably 5.2 to 6.8 wt. %, preferably 5.3 to 6.7 wt. %, preferably 5.4 to 6.6 wt. %, preferably 5.5 to 6.5 wt. %, preferably 5.6 to 6.4 wt. %, preferably 5.7 to 6.3 wt. %, preferably 5.8 to 6.2 wt. %, more preferably 5.9 to 6.1 wt.

%, and yet more preferably about 6 wt. % based on a total weight of the MOF. In a preferred embodiment, the MOF includes units of guanidine in an amount of 6 wt. % based on a total weight of the MOF.

In some embodiments, the MOF includes units of guanidine in an amount of 8 to 12 wt. %, preferably 8.2 to 11.8 wt. %, preferably 8.4 to 11.6 wt. %, preferably 8.6 to 11.4 wt. %, preferably 8.8 to 11.2, preferably 9 to 11 wt. %, preferably 9.2 to 10.8 wt. %, preferably 9.4 to 10.6 wt. %, preferably 9.6 to 10.4 wt. %, more preferably 9.8 to 10.2 wt. %, and yet more preferably about 10 wt. % based on a total weight of the MOF. In a preferred embodiment, the MOF includes units of guanidine in an amount of 10 wt. % based on a total weight of the MOF.

In some embodiments, the MOF includes units of guanidine in an amount of 18 to 22 wt. %, preferably 18.2 to 21.8 wt. %, preferably 18.4 to 21.6 wt. %, preferably 18.6 to 21.4 wt. %, preferably 18.8 to 21.2, preferably 19 to 21 wt. %, preferably 19.2 to 20.8 wt. %, preferably 19.4 to 20.6 wt. %, preferably 19.6 to 20.4 wt. %, more preferably 19.8 to 20.2 wt. %, and yet more preferably about 20 wt. % based on a total weight of the MOF. In a preferred embodiment, the MOF includes units of guanidine in an amount of 20 wt. % based on a total weight of the MOF.

In some embodiments, the MOF may exist in different morphologies including, but not limited to, nanowires, nanospheres, nanocrystals, nanorectangles, nanotriangles, nanopentagons, nanohexagons, nanoprisms, nanodisks, nanocubes, nanoribbons, nanoblocks, nanotoroids, nanodiscs, nanobarrels, nanogranules, nanowhiskers, nanoflakes, nanofoils, nanopowders, nanoboxes, nanobeads, nanobelts, nanourchins, nanoflowers, nanostars, tetrapods, mixtures thereof, and the like. In a preferred embodiment, the MOF is in the shape of spherical particles. The MOF is in the shape of spherical particles with a longest dimension of 50 to 250 nm, preferably 70 to 230 nm, preferably 90 to 210 nm, preferably 110 to 190 nm, and preferably 130 to 170 nm. In one embodiment, the spherical particles are layered. In some embodiments, the spherical particles are layered on each other to form a layer of spherical particles. In some embodiments, the spherical particles are comprised of layered nanoparticles having a length of 0.1 to 10 nm, preferably 0.5 to 8 nm, preferably 1 to 6 nm, and preferably 2 to 4 nm. In other embodiments, the layered nanoparticles are spherical.

In some embodiments, the MOF has a d-spacing of 0.235 to 0.245 nm, preferably 0.236 to 0.244 nm, preferably 0.237 to 0.243 nm, preferably 0.238 to 0.242 nm, more preferably 0.239 to 0.241 nm, and yet more preferably about 0.241 nm and 0.260 and 0.265 nm, preferably 0.261 to 0.264 nm, more preferably 0.262 to 0.263 nm, and yet more preferably about 0.262 nm. In a preferred embodiment, the MOF has a d-spacing of 0.241 nm and 0.262 nm.

In some embodiments, a method of $CO_2$ sequestration is described. The method includes flowing $CO_2$ over the MOF to adsorb the $CO_2$ onto the MOF. In some embodiments, the method of $CO_2$ sequestration occurs in a reactor, an enclosed space, an open space, a combination thereof, and the like. In some embodiments, the $CO_2$ is flown over the MOF at a rate of 0.1 to 10 mL/min, preferably 0.5 to 8 mL/min, preferably 1 to 6 mL/min, and preferably 2 to 4 mL/min. In some embodiments, the method of $CO_2$ sequestration occurs at a temperature of −50 to 100° C., preferably −40 to 80° C., preferably-30 to 60° C., preferably-20 to 40° C., preferably-10 to 30° C., and preferably 0 to 25° C. In some embodiments, the $CO_2$ is adsorbed on the MOF. In some embodiments, the $CO_2$ is adsorbed on amines of the units of guanidine. In some embodiments, the $CO_2$ is adsorbed on magnesium and/or cadmium of the MOF. In other embodiments, the $CO_2$ is adsorbed on amines of the units of guanidine and on magnesium and/or cadmium of the MOF. In some embodiments, the $CO_2$ is captured through interaction with the amine groups present in the guanidine units within the MOF structure, enhancing the ability to selectively adsorb and store $CO_2$. In some embodiments, the adsorbed $CO_2$ on the MOF may be released under conditions such as an increased temperature and/or a decreased pressure.

In some embodiments, the MOF has a $CO_2$ uptake value of 100 to 120 cubic centimeters per gram (cc/g), preferably 101 to 119 cc/g, preferably 102 to 118 cc/g, preferably 103 to 117 cc/g, preferably 104 to 116 cc/g, preferably 105 to 115 cc/g, preferably 106 to 114 cc/g, preferably 107 to 113 cc/g, preferably 108 to 112 cc/g, more preferably 109 to 111 cc/g, and yet more preferably about 110 cc/g at a pressure of 760 torr and a temperature of 273 kelvin (K). In a preferred embodiment, the MOF has a $CO_2$ uptake value of 110 cc/g at a pressure of 760 torr and a temperature of 273 K. In some embodiments, the MOF has a $CO_2$ uptake value of 70 to 90 cc/g, preferably 71 to 89 cc/g, preferably 72 to 88 cc/g, preferably 73 to 87 cc/g, preferably 74 to 86 cc/g, preferably 75 to 85 cc/g, preferably 76 to 84 cc/g, preferably 77 to 83 cc/g, preferably 78 to 82 cc/g, more preferably 79 to 81 cc/g, and yet more preferably about 80 cc/g at a pressure of 760 torr and a temperature of 298 K. In a preferred embodiment, the MOF has a $CO_2$ uptake value of 80 cc/g at a pressure of 760 torr and a temperature of 298 K. In some embodiments, the MOF has a nitrogen ($N_2$) uptake value of 0 cc/g at a pressure of 760 torr and a temperature of 273 K. In some embodiments, the MOF has an $N_2$ uptake value of 0 cc/g at a pressure of 760 torr and a temperature of 298 K.

FIG. 1 illustrates a schematic flow chart of a method 50 of preparing the MOF. The order in which the method 50 is described is not intended to be construed as a limitation, and any number of the described method steps can be combined to implement the method 50. Additionally, individual steps may be removed or skipped from the method 50 without departing from the spirit and scope of the present disclosure.

At step 52, the method 50 includes dissolving a 2,5-dihydroxyterephthalic acid, a cadmium salt, and a magnesium salt in a solvent mixture to form a first solution In some embodiments, cadmium salt may include, but is not limited to, cadmium acetate dihydrate, cadmium chloride, cadmium sulfate, cadmium iodide, cadmium bromide, cadmium fluoride, cadmium nitrate, cadmium oxalate, cadmium carbonate, cadmium phosphate, cadmium perchlorate, cadmium thiocyanate, cadmium formate, cadmium tartrate, cadmium benzoate, cadmium citrate, cadmium stearate, cadmium propionate, cadmium lactate, cadmium gluconate, cadmium succinate, cadmium valerate, cadmium malonate, cadmium butyrate, cadmium salicylate, cadmium arsenate, cadmium chromate, cadmium molybdate, cadmium tungstate, cadmium silicate, cadmium selenite, its hydrate, mixtures thereof, and the like. In a preferred embodiment, cadmium salt is cadmium nitrate tetrahydrate.

In some embodiments, the magnesium salt may include, but is not limited to, magnesium sulfate heptahydrate, magnesium chloride hexahydrate, magnesium acetate, magnesium carbonate, magnesium citrate, magnesium lactate, magnesium gluconate, magnesium phosphate, magnesium oxide, magnesium stearate, magnesium fluoride, magnesium bromide, magnesium iodide, magnesium formate, magnesium tartrate, magnesium malate, magnesium succinate, magnesium aspartate, magnesium benzoate, magnesium perchlorate, magnesium thiocyanate, magnesium silicate, magnesium chromate, magnesium molybdate, magnesium arsenate, magnesium valerate, magnesium nitrate, magnesium butyrate, magnesium salicylate, and magnesium oxalate, its hydrate, mixtures thereof, and the like. In a preferred embodiment, magnesium salt is magnesium nitrate hexahydrate.

In some embodiments, a molar ratio of cadmium salt to the magnesium salt is from 1:2 to 2:1, preferably 1:1.9 to 1.9:1, preferably 1:1.8 to 1.8:1, preferably 1:1.7 to 1.7:1, preferably 1:1.6 to 1.6:1, preferably 1:1.5 to 1.5:1, preferably 1:1.4 to 1.4:1, preferably 1:1.3 to 1.3:1, preferably 1:1.2 to 1.2:1, more 1:1.1 to 1.1:1, and preferably about 1:1. In a preferred embodiment, a molar ratio of cadmium salt to the magnesium salt is 1:1.2.

In some embodiments, the solvent mixture may include, but is not limited to, water-ethanol, methanol-water, acetone-water, ethanol-acetone, methanol-acetone, acetonitrile-water, dimethyl sulfoxide (DMSO)-water, tetrahydrofuran (THF)-water, dioxane-water, ethanol-isopropanol, ethanol-chloroform, methanol-chloroform, ethanol-hexane, acetone-hexane, ethyl acetate-hexane, toluene-ethanol, benzene-ethanol, acetonitrile-methanol, acetonitrile-ethanol, DMSO-methanol, THF-ethanol, methanol-ethyl acetate, ethanol-ethyl acetate, isopropanol-water, acetone-isopropanol, dioxane-methanol, methanol-toluene, DMSO-acetone, acetonitrile-THF, N—N-dimethylformamide (DMF)-ethanol, chloroform-water, combinations thereof, and the like. Water may be tap water, distilled water, double-distilled water, deionized water, deionized distilled water, reverse osmosis water, a combination thereof, and/or some other water. In a preferred embodiment, the solvent mixture is DMF, ethanol, and deionized water. In some embodiments, the solvent mixture has a volumetric ratio of 15:1:1 of dimethylformamide to ethanol to water. In other embodiments, the solvent mixture has a volumetric ratio of 1:1:1 to 20:1:1, preferably 2:1:1 to 18:1:1, preferably 3:1:1 to 16:1:1, preferably 5:1:1 to 15:1:1, preferably 8:1:1 to 12:1:1 of dimethylformamide to ethanol to water. In a preferred embodiment, the solvent mixture has a volumetric ratio of 15:1:1 of dimethylformamide to ethanol to water.

At step 54, the method 50 includes sonicating the first solution for 5 to 15 minutes (min), preferably 6 to 14 min, preferably 7 to 13 min, preferably 8 to 12 min, more preferably 9 to 11 min, and yet more preferably about 10 min. In a preferred embodiment, the first solution is sonicated for 10 min. In some embodiments, other modes of agitation known to those of ordinary skill in the art, for example, via stirring, swirling, mixing, or a combination thereof may be employed in combination with or in place of sonicating to form the resultant mixture.

At step 56, the method 50 heating the first solution to a temperature of 120 to 140° C. for 20 to 28 hours (h) to form a first product. In some embodiments, first solution is heated to a temperature of 120 to 140° C., preferably 121 to 139° C., preferably 122 to 138° C., preferably 123 to 137° C., preferably 124 to 136° C., preferably 125 to 135° C., preferably 126 to 134° C., preferably 127 to 133° C., preferably 128 to 132° C., more preferably 129 to 131° C., and yet more preferably about 130° C. for 20 to 28 h, preferably 21 to 27 h, preferably 22 to 26 h, more preferably 23 to 25 h, and yet more preferably about 24 h. In a preferred embodiment, first solution is heated to a temperature of 130° C. for 24 h to form the first product.

At step 58, the method 50 includes washing and drying the first product. In some embodiments, washing may be done by using water, ethanol, isopropanol, acetone, acetonitrile, ethyl acetate, hexane, heptane, toluene, chloroform, dichloromethane, DMF, diethyl ether, tetrahydrofuran, dioxane, butanol, propanol, formic acid, acetic acid, nitric acid (dilute), hydrochloric acid (dilute), sodium bicarbonate solution, sodium hydroxide solution (dilute), ammonium hydroxide (dilute), hydrogen peroxide (dilute), phosphate-buffered saline (PB S), brine solution, saline water, citric acid solution, deionized water, distilled water, a combination thereof, and the like. In a preferred embodiment, the washing is done with DMF and methanol. In some embodiments, the drying is done at a temperature of 50 to 100° C., preferably 60 to 95° C., preferably 70 to 90° C., more preferably 75 to 85° C., and yet more preferably about 80° C. In a preferred embodiment, the drying is done at 80° C.

At step 60, the method 50 includes mixing the first product with a guanidine salt in a polar organic solvent to form a second mixture. In some embodiments, the guanidine salt may include, but is not limited to, guanidine nitrate, guanidine sulfate, guanidine carbonate, guanidine phosphate, guanidine acetate, guanidine oxalate, guanidine citrate, guanidine hydrochloride, guanidine tartrate, guanidine benzoate, guanidine salicylate, guanidine formate, guanidine fumarate, guanidine succinate, guanidine maleate, guanidine lactate, guanidine gluconate, guanidine valerate, guanidine malate, guanidine butyrate, guanidine propionate, guanidine ascorbate, guanidine stearate, guanidine chromate, guanidine picrate, guanidine borate, guanidine perchlorate, guanidine thiocyanate, guanidine bicarbonate, guanidine silicate, guanidine arsenate, its hydrate, mixtures thereof, and the like. In a preferred embodiment, the guanidine salt is a guanidine hydrochloride.

An organic solvent is a carbon-based substance employed for the dissolution of other substance(s). Polar organic solvents are organic solvents containing a partial positive charge and a partial negative charge. In a preferred embodiment, the polar organic solvent may include, but is not limited to, water, methanol, ethanol, isopropanol, n-propanol, n-butanol, sec-butanol, tert-butanol, 1-pentanol, 2-pentanol, 3-pentanol, 1-hexanol, 2-hexanol, 2-methyl-1-propanol, 2-methyl-2-propanol, benzyl alcohol, cyclohexanol, ethylene glycol, propylene glycol, glycerol, formic acid, acetic acid, lactic acid, trifluoroethanol, trichloroethanol, phenol, cresol, 2-naphthol, catechol, resorcinol, hydroquinone, a combination thereof, and the like. In a preferred embodiment, polar organic solvent is ethanol.

At step 62, the method 50 includes refluxing the second mixture at a temperature of 50 to 70° C. for 20 to 28 h to form a second product. In some embodiments, second solution is heated at a temperature of 50 to 70° C., preferably 51 to 69° C., preferably 52 to 68° C., preferably 53 to 67° C., preferably 54 to 66° C., preferably 55 to 65° C., preferably 56 to 64° C., preferably 57 to 63° C., preferably 58 to 62° C., more preferably 59 to 61° C., and yet more preferably about 60° C. for 20 to 28 h, preferably 21 to 27 h, preferably 22 to 26 h, more preferably 23 to 25 h, and yet more preferably about 24 h. In a preferred embodiment, the second solution is heated at 60° C. for 24 h to form the second product.

At step 64, the method 50 washing and drying the second product to form the MOF. In some embodiments, washing is done with water, ethanol, isopropanol, acetone, acetonitrile, ethyl acetate, hexane, heptane, toluene, chloroform, dichloromethane, diethyl ether, tetrahydrofuran, dioxane, butanol, propanol, formic acid, acetic acid, nitric acid (dilute), hydrochloric acid (dilute), sodium bicarbonate solution, sodium hydroxide solution (dilute), ammonium hydroxide (dilute), hydrogen peroxide (dilute), phosphate-buffered saline (PBS), brine solution, saline water, citric acid solution, deionized water, distilled water, a combination thereof, and the like. In a preferred embodiment, washing is done with methanol. In some embodiments, dying is done at a temperature of 50 to 100° C., preferably 55 to 95° C., preferably 60 to 90° C., preferably 65 to 85° C., and preferably 70 to 80° C. In a preferred embodiment, dying is done at 80° C.

The following examples are provided solely for illustration and are not to be construed as limitations of the present disclosure, as many variations thereof are possible without departing from the spirit and scope of the present disclosure.

EXAMPLES

The following examples describe and demonstrate an amine appended bimetallic MOF-74 including linking units of 2,5-dihydroxyterephthalic acid complexed with cadmium and magnesium (CdMg-MOF-74) for carbon dioxide ($CO_2$) capture. The examples are provided solely for illustration and are not to be construed as limitations of the present disclosure, as many variations thereof are possible without departing from the spirit and scope of the present disclosure.

Example 1: Chemicals

The chemicals used were analytical grade. 2,5-dihydroxterephthalic acid ($H_4DOBDC$) 98% was obtained from Aldrich, magnesium nitrate hexahydrate ($Mg(NO_3)_2 \cdot 6H_2O$) was obtained from EM SURE, cadmium nitrate tetrahydrate ($Cd(NO_3)_2 \cdot 4H_2O$)≥99.0% was obtained from Sigma-Aldrich, guanidine hydrochloride (GuHCl)≥98% was obtained from Sigma, N—N-dimethylformamide (DMF) anhydrous 99.8% was obtained from Sigma-Aldrich, and absolute Ethanol (Et)≥99.8% was obtained from Honeywell. M ethanol (Me) and deionized water were also used.

Example 2: Synthesis of Bimetallic CdMg-MOF-74

Figure 2:
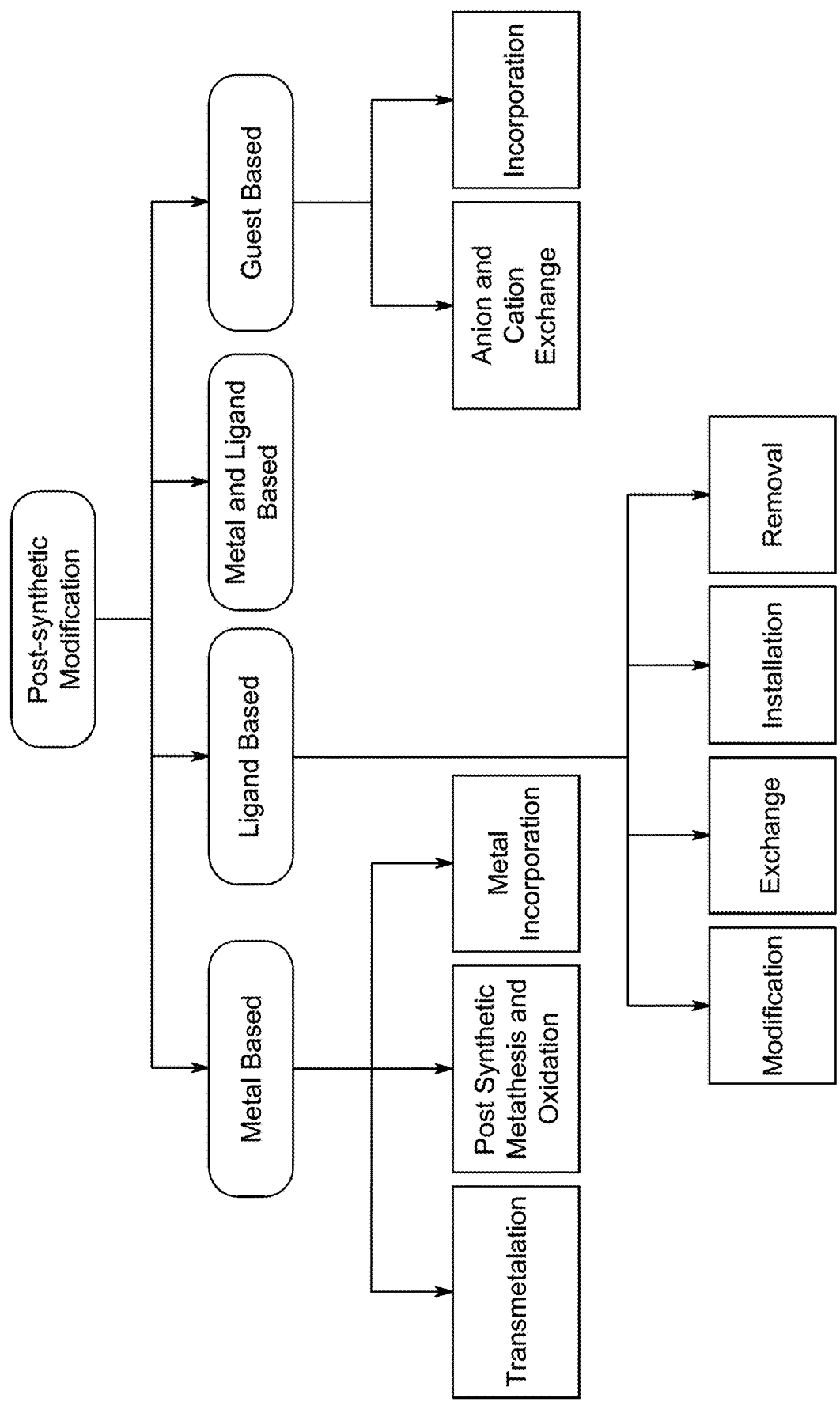
FIG. 2 is a schematic depicting different post-synthetic modification methods to enhance selectivity and carbon dioxide ($CO_2$) adsorption capacity of MOF-74, according to certain embodiments.

New approaches have been investigated to enhance the selectivity and carbon dioxide ($CO_2$) adsorption capacity of MOF-74 through integration of bimetallic elements into the framework structure along with post-synthetic modification by an amine. Incorporation of a bimetallic element into the MOF can boost its stability and strength for applications involving long-term capture of $CO_2$. Incorporation of a second metal center has the potential to alter the pore environment and increase the MOF's attraction for $CO_2$ molecules. Addition of a second metal center, such as cadmium (Cd), into a Mg-MOF-74 structure will enable the formation of bimetallic MOF-74 materials. Alteration has the potential to result in enhanced adsorption capacities and improved selectivity, thereby promoting effective absorption of $CO_2$ even when other gases are present. A second approach to enhance $CO_2$ absorption is by post-synthetic modification by amine functionalized (N-functionalized) solid adsorbents. There are two paths to introduce functional groups to MOFs: a pre-synthetic approach or a post-synthetic approach. The post-synthetic functionalization approach involves series of chemical reactions to introduce Lewis acid sites or Lewis base sites. The post-synthetic approach has a more predicted and controlled outcome structure of the modified MOFs (as seen in FIG. 2).

CdMg-MOF-74 was synthesized by a solvothermal method [Xie, W. and Wan, F., Guanidine post-functionalized crystalline ZIF-90 frameworks as a promising recyclable catalyst for the production of biodiesel via soybean oil transesterification, *Energy Conversion and Management*, 2019, 198, 111922, which is incorporated herein by reference in its entirety]. First, 0.7825 millimoles (mmol) (0.1550 grams (g)) of $H_4DOBDC$, 1.296 mmol (0.3325 g) of $Mg(NO_3)_2 \cdot 6H_2O$, and 1.077 mmol (0.3325 g) of $Cd(NO_3)_2 \cdot 4H_2O$ were dissolved in 70 milliliters (mL) mixed solvent. The mixed solvent was prepared according to the following ratio volume by volume by volume (v/v/v) 15:1:1 DMF:Et:deionized water, respectively. The mixture was sonicated for 10 minutes (min) to get clear mixture prior transferring it to an autoclave reactor. The autoclave reactor was placed in an oven at 130° C. for 24 hours (h). After cooling the reactor to room temperature, the resultant product was centrifuged and washed three times with DMF and methanol. Finally, the solid material was vacuum dried at 80° C. overnight.

Example 3: Synthesis of Guanidine Modified CdMg-MOF-74

A series of modified bimetallic mixtures were prepared using a post-synthesis approach with different guanidine amine percentages, as listed in Table 1. For 10% PA@CdMg-MOF-74 (also referred to as 10 wt. % PA@CdMg-MOF-74), a solution made of 25 milligrams (mg) of guanidine hydrochloride and 20 mL ethanol was stirred for 10 minutes (min), followed by adding 250 mg of CdMg-MOF-74. The mixture was then refluxed for 24 h at 60° C. After cooling the solution to room temperature, it was centrifuged and washed three times with methanol to separate the yellow solid compound. Finally, it was transferred to an oven at 80° C. to dry.

TABLE 1

A series of post-synthetic modified bimetallic M OF-74 with various amount of amine

| Bimetallic Compounds | Gu (mg) | Gu (%) | CdM g-M OF-74 (mg) |
|---|---|---|---|
| 2% PA @ CdM g-M OF-74 | 5 | 2 | 250 |
| 6% PA @ CdM g-M OF-74 | 15 | 6 | 250 |
| 10% PA @ CdM g-M OF-74 | 25 | 10 | 250 |
| 20% PA @ CdM g-M OF-74 | 50 | 20 | 250 |

Example 4: Characterization

The synthesized products were subjected to a series of analytical techniques including X-ray diffraction (XRD), Fourier-transform infrared (FTIR) spectroscopy, scanning electron microscopy (SEM), and transmission electron microscopy (TEM). The XRD patterns were verified by powder XRD with Cu Kα radiation sources. FTIR spectroscopy with a KBr pellet was used to identify the presence of functional groups. SEM was employed to determine the structure of the samples. TEM was used to visualize the structure and calculate d-spacing of the MOFs.

Example 5: Adsorption/Desorption Characteristics

Brunauer-Emmett-Teller (BET) surface area analysis was conducted for the post-modified bimetallic MOF compounds using nitrogen ($N_2$) and $CO_2$ gases to analyze the $N_2$ and $CO_2$ adsorption/desorption behaviors. Temperature-programmed desorption (TPD) using two sequential methods, $CO_2$ and ammonia (NH 3) was used to record the maximum adsorption as a function of temperature, and the acidic and basic sites in the post-modified MOF product.

Figure 3:
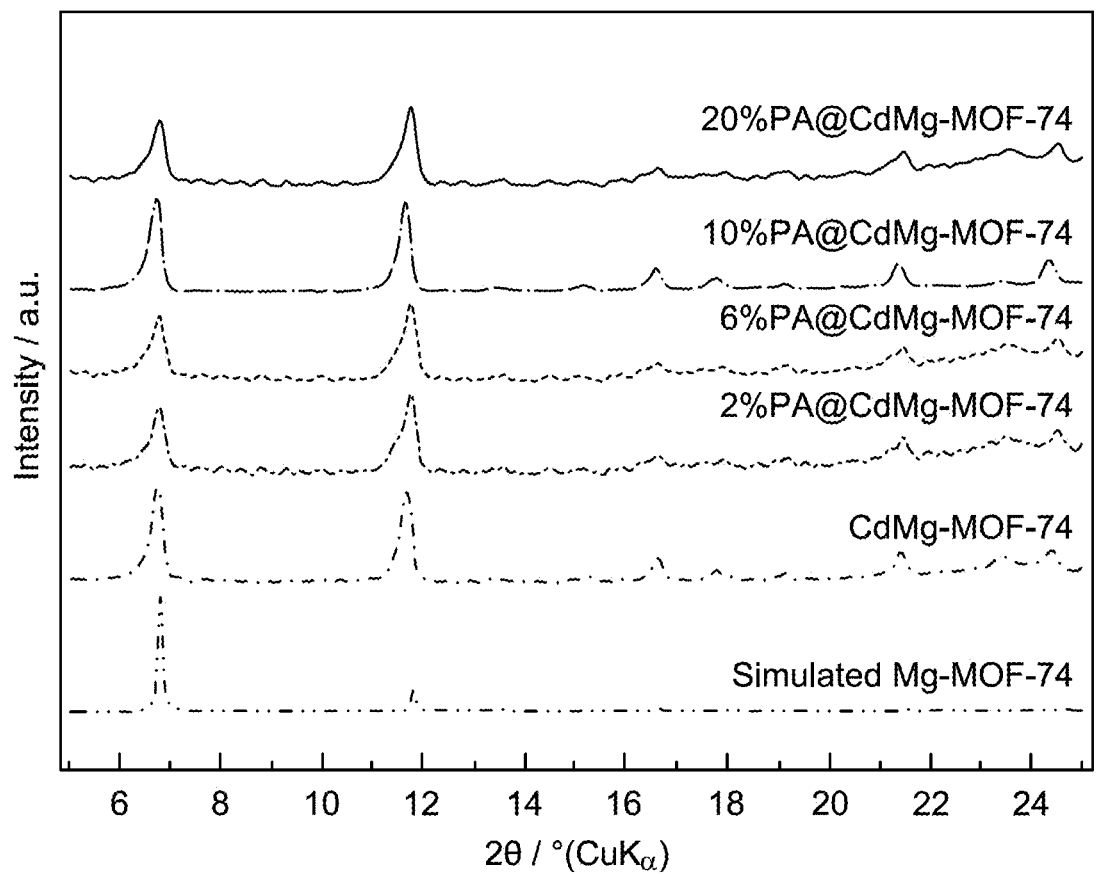
FIG. 3 depicts powder X-ray diffraction (XRD) patterns for CdMg-MOF-74, simulated Mg-MOF-74, and samples of guanidine amine modified CdMg-MOF-74 (i.e., 2 wt. % PA@CdMg-MOF-74, 6 wt. % PA@CdMg-MOF-74, 10 wt. % PA@CdMg-MOF-74, and 20 wt. % PA@ CdMg-MOF-74), according to certain embodiments.

The production process of post-modified bimetallic MOFs has two steps. In the first step, the bimetallic MOF CdMg-MOF-74 was synthesized and validated. The powder-XRD pattern of the synthesized product was compared with the simulated Mg-MOF-74 from the Cambridge Crystallographic Data Center (CCDC) website. FIG. 3 depicts powder-XRD patterns for CdMg-MOF-74, simulated Mg-MOF-74, and different samples of guanidine amine modified CdMg-MOF-74 (i.e., 2% PA@CdMg-MOF-74, 6% PA@CdMg-MOF-74, 10% PA@CdMg-MOF-74, and 20% PA@CdMg-MOF-74). Between the simulated M g-MOF-74 and CdMg-MOF-74, a pattern difference can be noted in terms of the peaks' intensities and crystallinity. The powder-XRD of CdMg-MOF-74 derivatives (in FIG. 3) are closely matched the simulated peaks of M g-MOF-74. The two main peaks of M g-MOF-74 are present at 7 degrees (°) and 12°. New and smaller peaks were observed in the CdMg-MOF-74. Guanidine was added to the CdMg-MOF-74 in various percentages, namely 2% PA @CdMg-MOF-74, 6% PA@CdMg-MOF-74, 10% PA@CdMg-MOF-74, and 20% PA@CdMg-MOF-74 to assess the extent of amine functional groups. The peak intensity at 7° was impacted with the addition of amine functional groups, while minor changes were noticed at 12°.

Figure 4A:
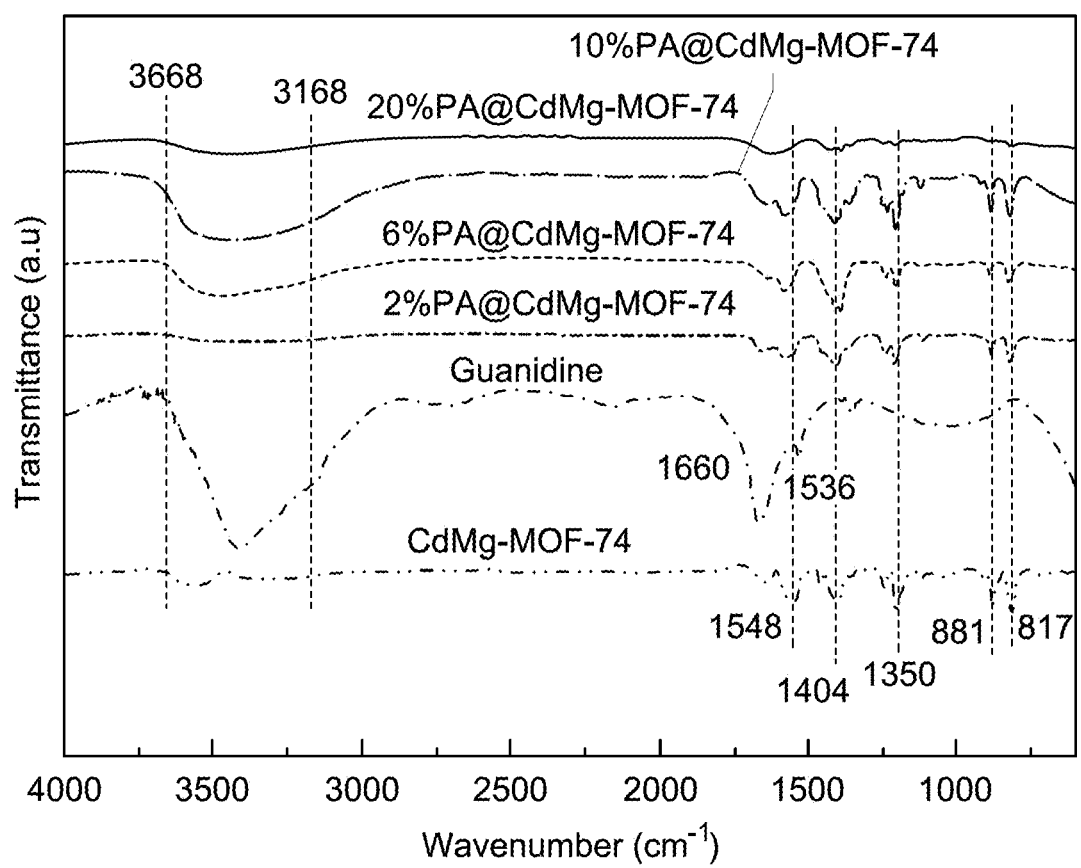
FIG. 4A depicts Fourier-transform infrared (FTIR) spectra for CdMg-MOF-74, guanidine, and samples of guanidine amine modified CdMg-MOF-74 (i.e., 2 wt. % PA@CdMg-MOF-74, 6 wt. % PA@CdMg-MOF-74, 10 wt. % PA@CdMg-MOF-74, and 20 wt. % PA@CdMg-MOF-74), according to certain embodiments.
Figure 4B:
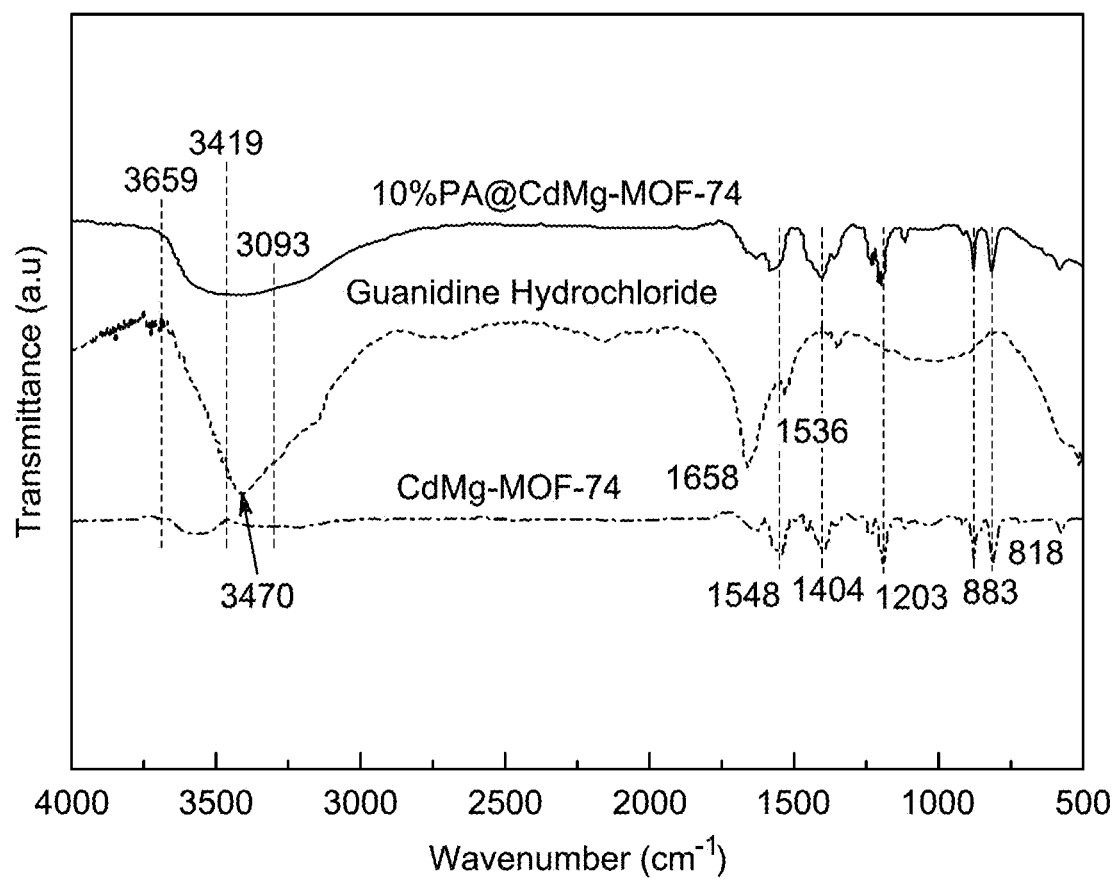
FIG. 4B depicts FTIR spectra for CdMg-MOF-74, guanidine, and 10 wt. % PA@CdMg-MOF-74, according to certain embodiments.

FTIR was used to assess linker stability, presence, and attachment of the guanidine. FIG. 4A depicts FTIR spectra of CdMg-MOF-74, guanidine, and different samples of guanidine amine modified CdMg-MOF-74 (2% PA@CdMg-MOF-74, 6% PA @CdMg-MOF-74, 10% PA@CdMg-MOF-74, and 20% PA @CdMg-MOF-74). FIG. 4B depicts FTIR spectra of CdMg-MOF-74, guanidine, and 10% PA@CdMg-MOF-74. Indication of an amine presence is seen as an N—H stretching peak (as seen in FIGS. 4A-4B). The asymmetric stretching vibration of —COO is responsible for the adsorption peaks at around 1600 wavenumbers (cm$^{-1}$) and the symmetric stretching vibration is visible at 1500 cm$^{-1}$. This suggests that the —COO from the linker is present. Additionally, the stretching vibrations at 881 cm$^{-1}$ and 817 cm$^{-1}$ are responsible for-CH adsorption peaks, suggesting the presence of a benzene ring structure. A peak at about 3570 cm$^{-1}$ is associated with the —OH stretching vibration from —OH groups in the synthesized materials. A peak at 1548 cm$^{-1}$ in the CdMg-MOF-74 FTIR spectrum is ascribed to the interaction between ligands and metal ions.

In the case of guanidine hydrochloride, the NH$_2$ and NH stretching vibration peaks of the guanidine is shown at 3470 cm$^{-1}$ and 3168 cm$^{-1}$. The guanidine hydrochloride exhibits a peak at 1658 cm$^{-1}$, which may be attributed to the amine's C=N stretching vibration. The best performing Mg-MOF-74 was reported with a 7.38 millimoles per gram (mmol·g$^{-1}$) CO$_2$ adsorption capacity. Good CO$_2$ chemisorption characteristics were demonstrated by the bimetallic modification with a carbon dioxide uptake value of 110 cubic centimeters per gram (cc/g). The connection between the metals promotes redox reactions with CO$_2$ and produce a large amount of oxygen-containing functional groups and unsaturated metal sites. A composite adsorbent with the benefits of wide source coverage, low cost, and high mechanical strength may be produced by combining MOFs with modified amine.

Figure 5A:
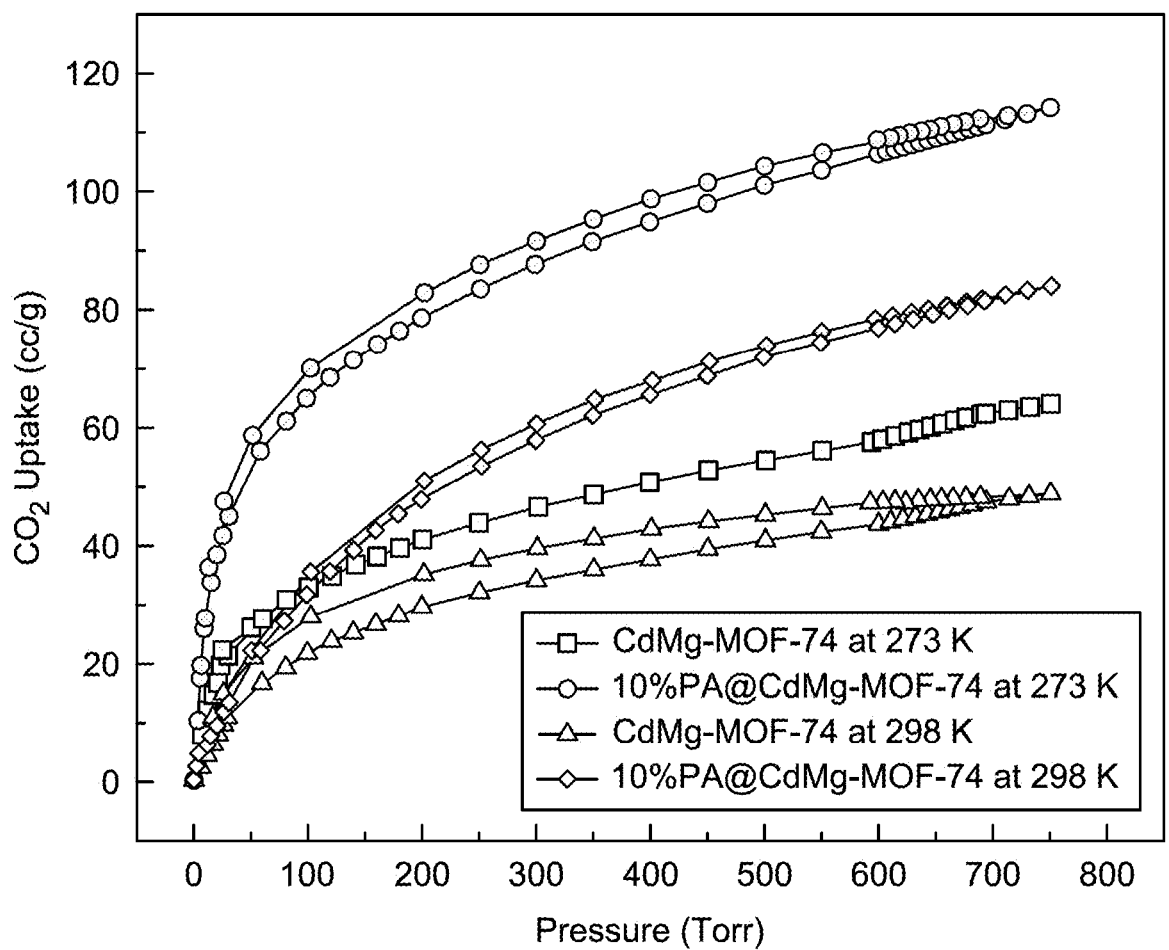
FIG. 5A depicts a dual-site Langmuir (DSL) model for $CO_2$ adsorption and desorption for CdMg-MOF-74 and 10 wt. % PA@CdMg-MOF-74 at 0° C. (273 kelvin (K)) and 25° C. (298 K), according to certain embodiments.
Figure 5B:
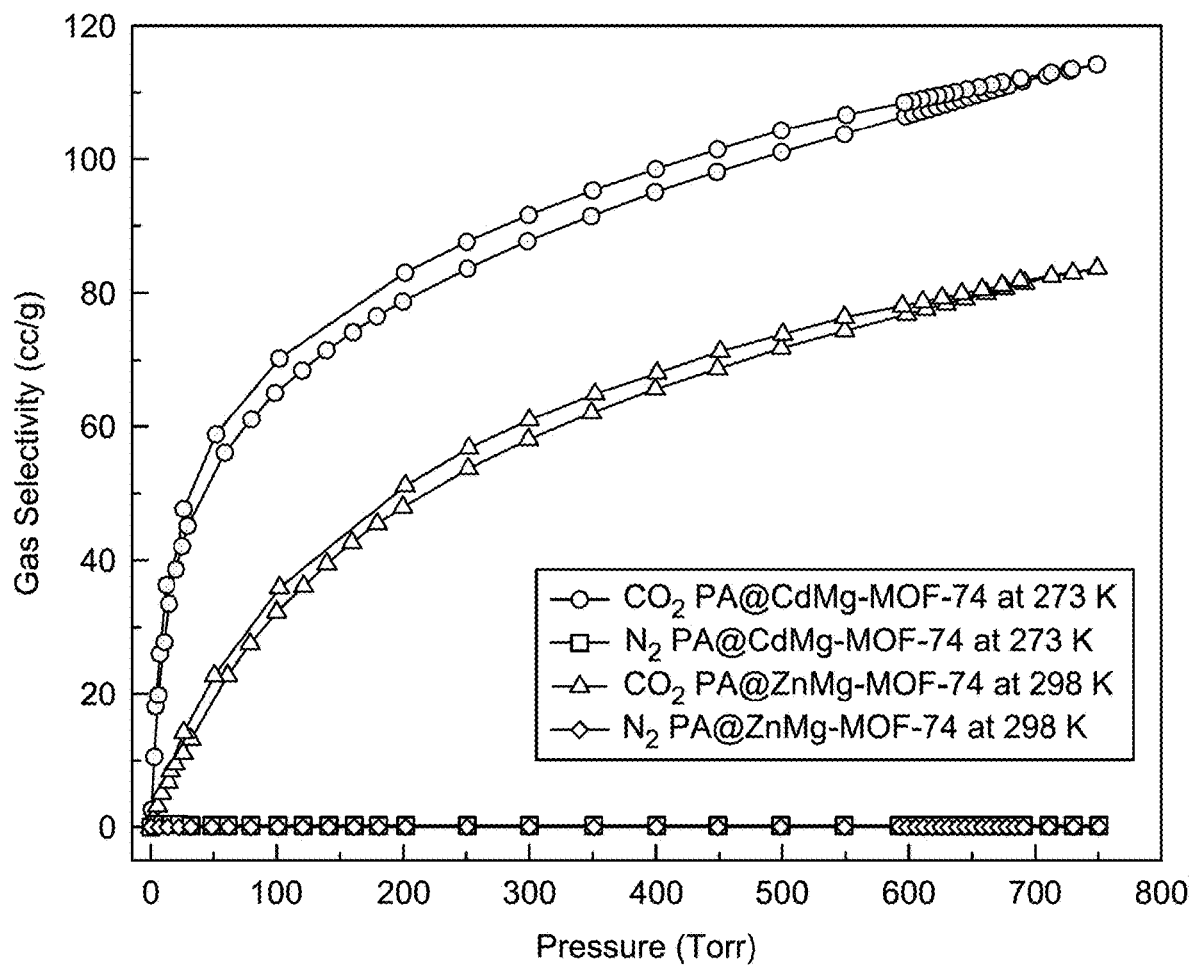
FIG. 5B depicts a comparison of $CO_2$ and nitrogen ($N_2$) selectivity of amine modified CdMg-MOF-74 (PA@CdMg-MOF-74) and ZnM g-MOF-74 at 273 K and 298 K, according to certain embodiments.

FIG. 5A depicts a dual site Langmuir (DSL) model for CO$_2$ adsorption and desorption for CdMg-MOF-74 and 10% PA@CdMg-MOF-74 at two different temperatures (0° C. (273 kelvin (K)) and 25° C. (298 K). FIG. 5B depicts a comparison of CO$_2$ selectivity versus N$_2$ selectivity of amine modified CdMg-MOF-74 and ZnM g-MOF-74 at 273 K and 298 K. The 10% PA@CdMg-MOF-74 at 273 K shows a CO$_2$ uptake value around 120 cc/g. The post synthetic modification of guanidine improves the CO$_2$ uptake value by creating a protection layer against moisture. FIGS. 5A-5B indicate CO$_2$ adsorption over CdMg-MOF-74 is minimally affected by temperature compared to N$_2$ adsorption due to strong interactions between CO$_2$ and the metal sites in CdMg-MOF-74 and the modified series. Additionally, the guanidine modification of CdMg-MOF-74 offers CO$_2$ selectivity compared to other adsorbents.

Figure 6A:
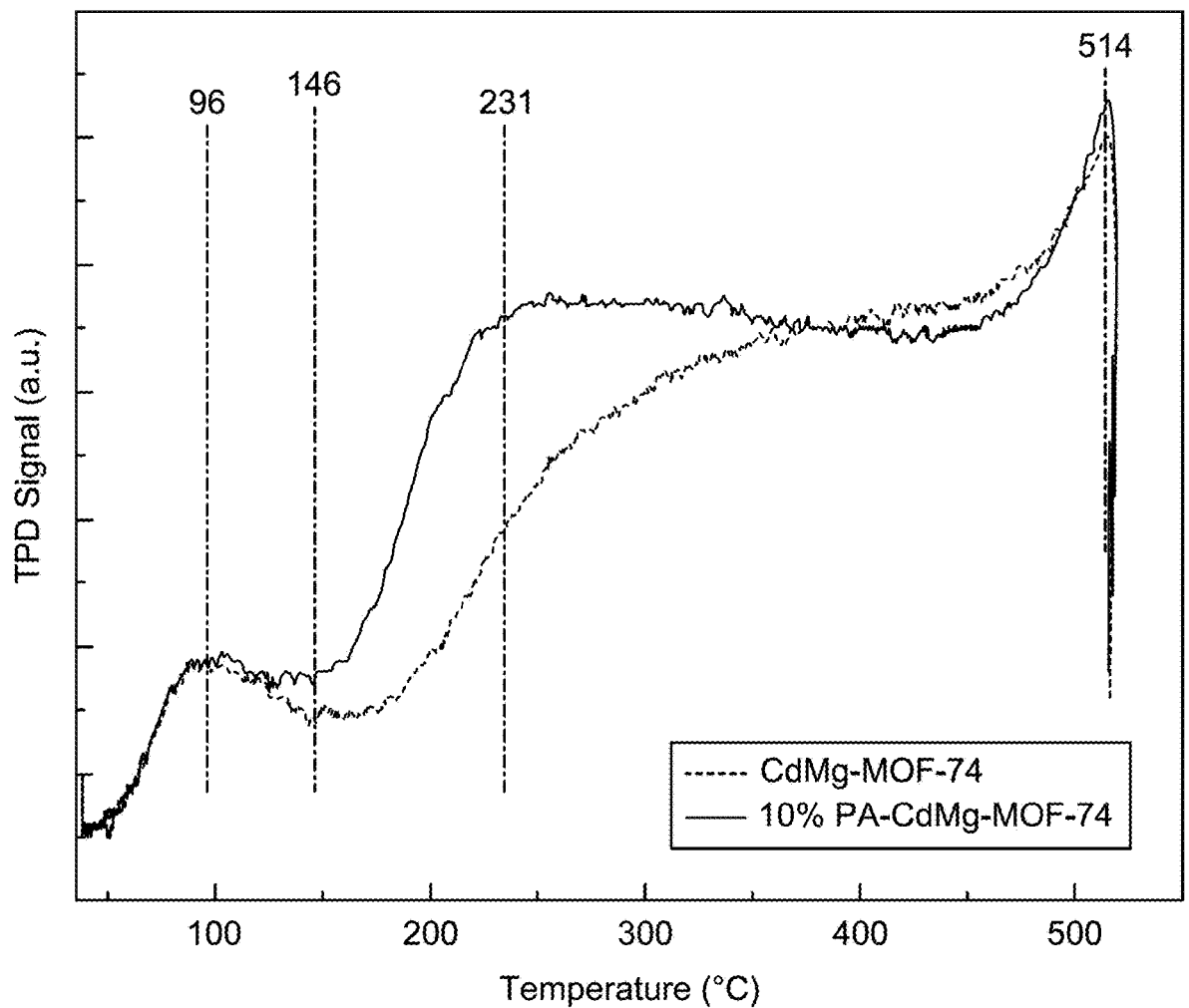
FIG. 6A is a plot of temperature programmed desorption (TPD) with $CO_2$ as a desorbing agent, according to certain embodiments.
Figure 6B:
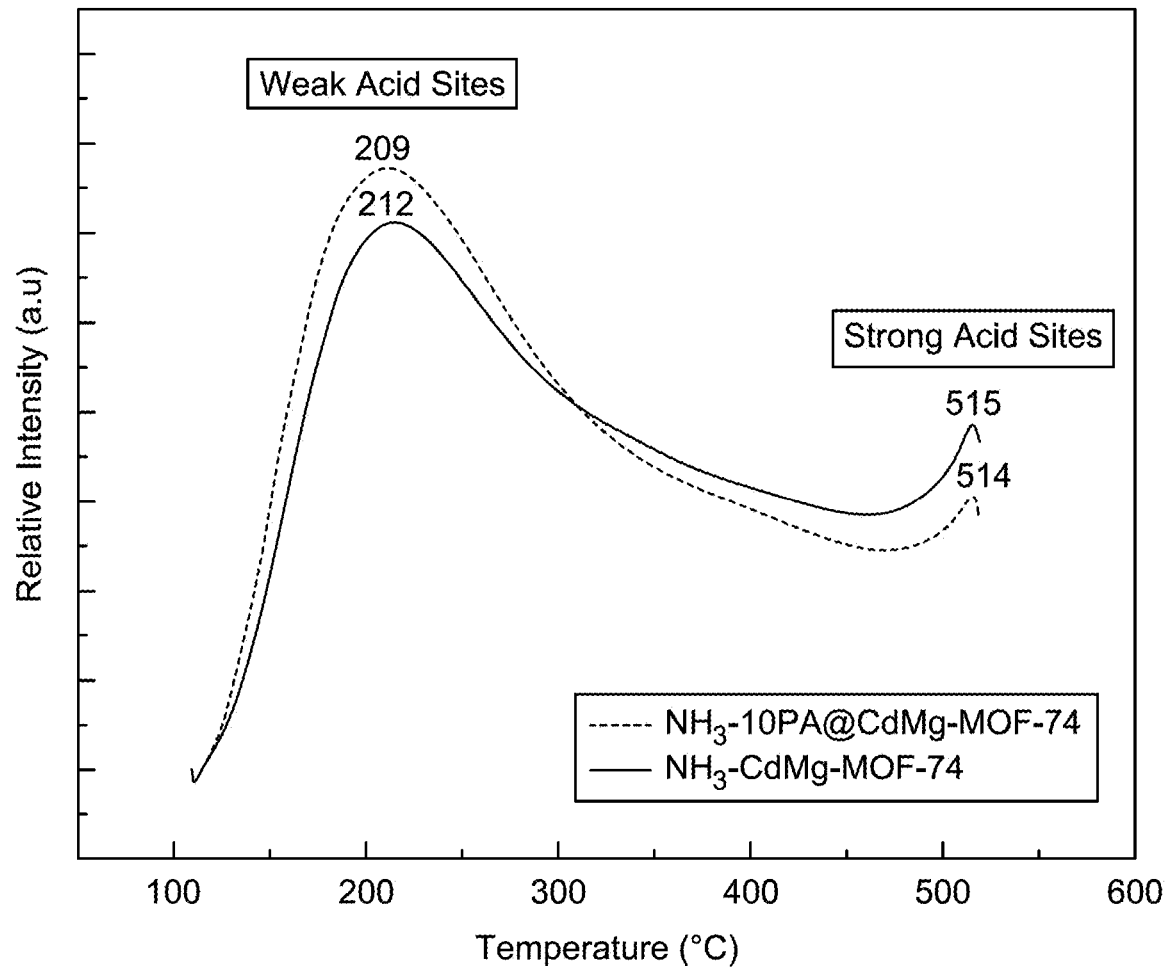
FIG. 6B is a plot of TPD with ammonia ($NH_3$) as a desorbing agent, according to certain embodiments.

FIG. 6A depicts a plot of temperature programmed desorption (TPD) using CO$_2$ as a desorbing agent. FIG. 6B depicts a plot for TPD using ammonia (NH$_3$) as a desorbing agent. The TPD analysis using CO$_2$ as the desorbing agent reflectse behavior of CdMg-MOF-74 before and after guanidine modification. The TPD gives insight into the desorption behavior of CO$_2$ and the MOFs surface area. The 10% PA@ CdMg-MOF-74 performance at 231° C. has a higher desorption peak intensity than CdMg-MOF-74 which suggests a higher concentration of acid sites.

Figure 7A:
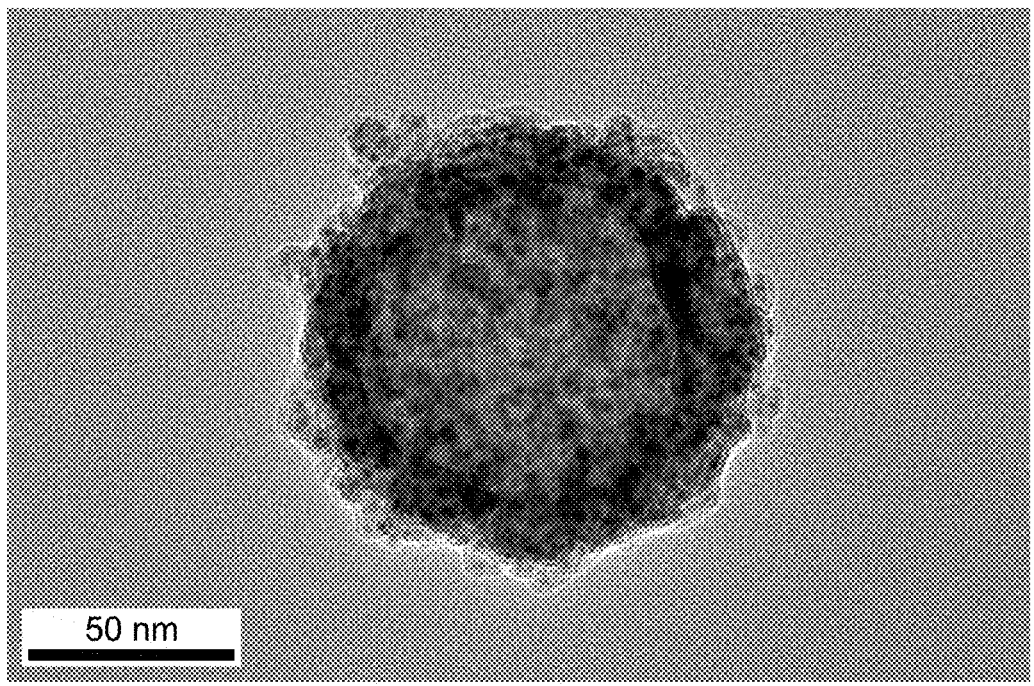
FIG. 7A is a transmission electron microscopy (TEM) image for 10 wt. % PA@CdMg-MOF-74 with a scale of 50 nanometers (nm), according to certain embodiments.
Figure 7B:
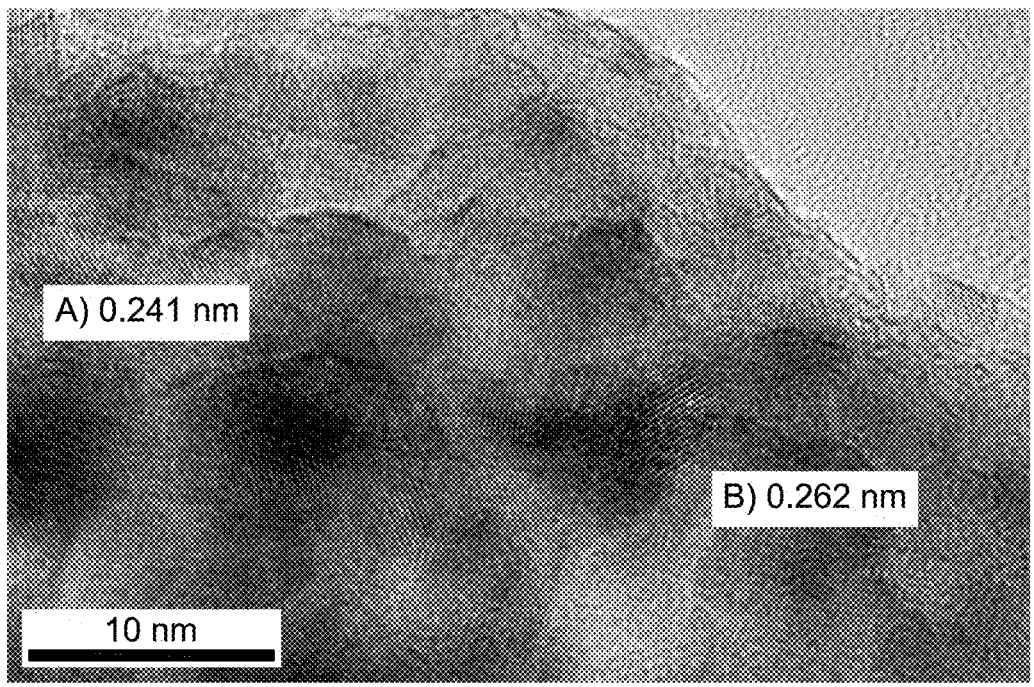
FIG. 7B is a high-resolution transmission electron microscopy (HR-TEM) image for 10 wt. % PA@CdMg-MOF-74 with a scale of 10 nm, according to certain embodiments.
Figure 7C:
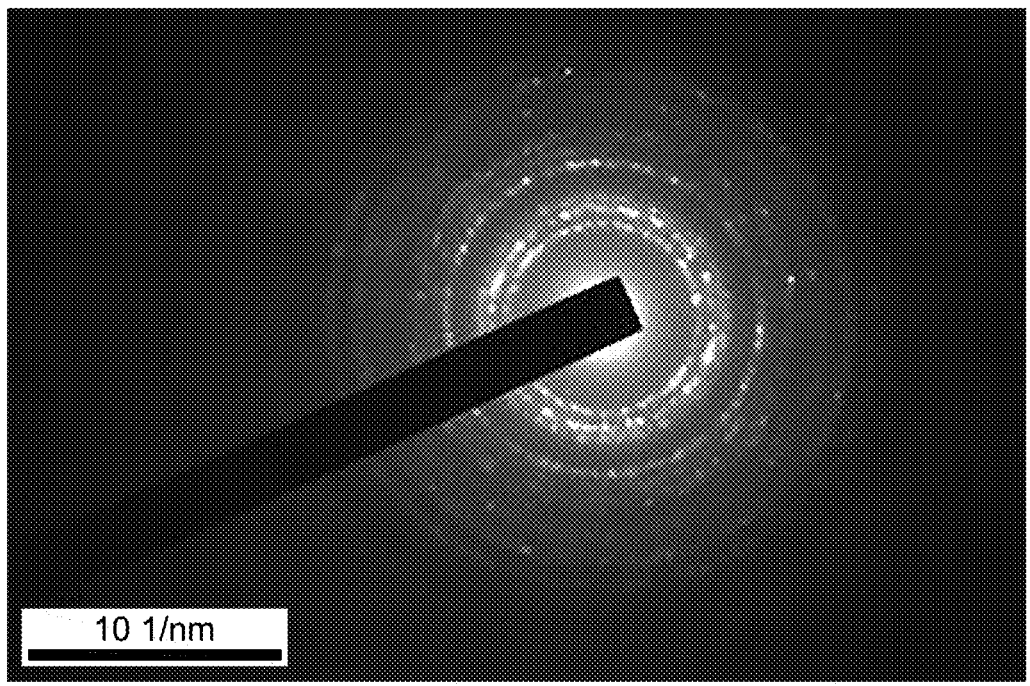
FIG. 7C is a selected area electron diffraction (SA ED) pattern for 10 wt. % PA@CdMg-MOF-74, according to certain embodiments.
Figure 7D:
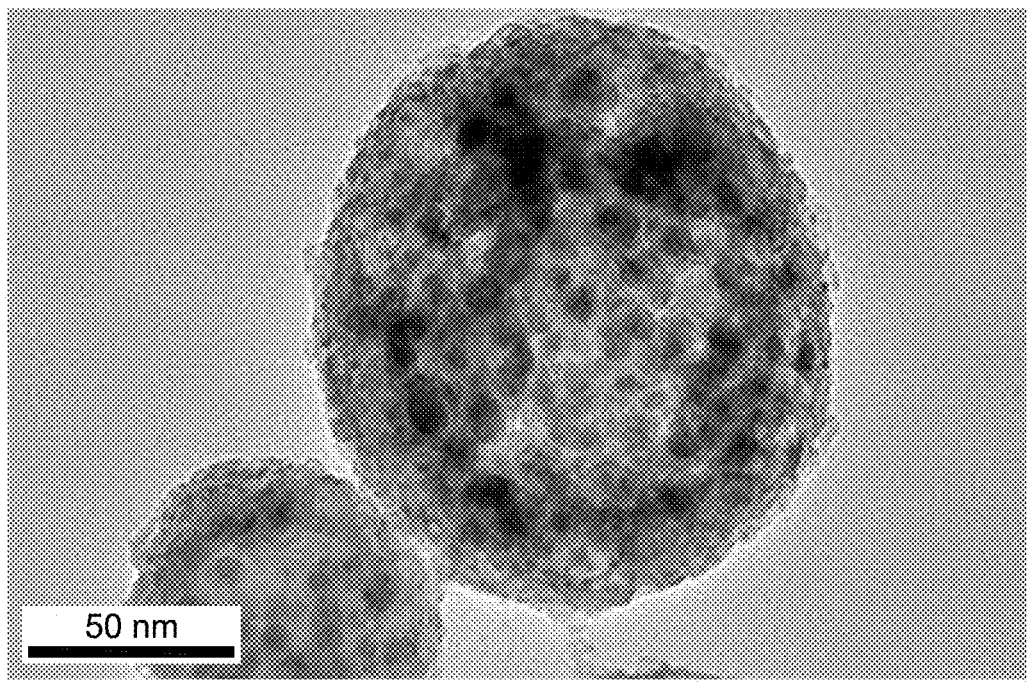
FIG. 7D is a TEM image for 10 wt. % PA@CdMg-MOF-74 with a scale of 50 nm, according to certain embodiments.

TEM analysis of 10% PA@CdMg-MOF-74 was further performed. FIG. 7A and FIG. 7D depict TEM images of 10% PA@CdMg-MOF-74 with a scale of 50 nm. FIG. 7B depicts a high-resolution TEM (HR-TEM) image of 10% PA@CdMg-MOF-74 with a scale of 10 nm showing lattice fringes. FIG. 7C depicts a selected area electron diffraction (SA ED) pattern for 10% PA@CdMg-MOF-74.

A series of modified bimetallic MOFs was synthesized to enhance CO$_2$ uptake and selectivity. 10% PA@CdMg-MOF-74 exhibited the best performance of the MOFs in the series. Additionally, the incorporation of guanidine improved the stability of CdMg-MOF-74 under wet conditions and enhanced both uptake and selectivity.

Numerous modifications and variations of the present disclosure are possible in light of the above teachings. It is therefore to be understood that within the scope of the appended claims, the disclosure may be practiced otherwise than as specifically described herein.

The invention claimed is:

1. A metal-organic framework (MOF), including:
cadmium;
magnesium;
linking units of 2,5-dihydroxyterephthalic acid complexed with cadmium and magnesium; and
units of,
wherein the units of guanidine are reacted with the linking units of 2,5-dihydroxyterephthalic acid,
wherein the MOF is in the shape of spherical particles with a longest dimension of 50 to 250 nanometers (nm),
wherein the MOF includes units of guanidine in an amount of 1 to 3 wt. % based on a total weight of the MOF.

2. The MOF of claim 1, wherein the units of guanidine form amine groups on an outer surface of the MOF.

3. A metal-organic framework (MOF),
including:
cadmium;
magnesium;
linking units of 2,5-dihydroxyterephthalic acid complexed with cadmium and magnesium; and
units of,
wherein the units of guanidine are reacted with the linking units of 2,5-dihydroxyterephthalic acid,
wherein the MOF is in the shape of spherical particles with a longest dimension of 50 to 250 nanometers (nm),
wherein the MOF includes units of guanidine in an amount of 8 to 12 wt. % based on a total weight of the MOF.

4. The MOF of claim 3, wherein the MOF has a carbon dioxide ($CO_2$) uptake value of 100 to 120 cubic centimeters per gram (cc/g) at a pressure of 760 torr and a temperature of 273 kelvin (K).

5. The MOF of claim 3, wherein the MOF has a $CO_2$ uptake value of 70 to 90 cc/g at a pressure of 760 torr and a temperature of 298 K.

6. The MOF of claim 3, wherein the MOF has a nitrogen ($N_2$) uptake value of 0 cc/g at a pressure of 760 torr and a temperature of 273 K.

7. The MOF of claim 3, wherein the MOF has an $N_2$ uptake value of 0 cc/g at a pressure of 760 torr and a temperature of 298 K.

8. The MOF of claim 1, wherein the units of guanidine act as Lewis acids.

9. The MOF of claim 1, wherein the MOF has a d-spacing of 0.235 to 0.245 nm and 0.260 to 0.265 nm.

10. The MOF of claim 1, wherein the MOF has more acid sites than the same MOF without the units of guanidine.

11. The MOF of claim 1, wherein the spherical particles are layered.

12. A metal-organic framework (MOF), including:
cadmium;
magnesium;
linking units of 2,5-dihydroxyterephthalic acid complexed with cadmium and magnesium; and
units of guanidine in an amount of 1 to 25 percent by weight (wt. %) based on a total weight of the MOF,
wherein the units of guanidine are reacted with the linking units of 2,5-dihydroxyterephthalic acid,
wherein the MOF is in the shape of spherical particles with a longest dimension of 50 to 250 nanometers (nm),
wherein the MOF is made by a process including:
dissolving a 2,5-dihydroxyterephthalic acid, a cadmium salt, and a magnesium salt in a solvent mixture to form a first solution;
sonicating the first solution for 5 to 15 minutes (min);
heating the first solution to a temperature of 120 to 140 degrees Celsius (° C.) for 20 to 28 hours (h) to form a first product;
washing and drying the first product;
mixing the first product with a guanidine salt in a polar organic solvent to form a second mixture;
refluxing the second mixture at a temperature of 50 to 70° C. for 20 to 28 h to form a second product;
washing and drying the second product to form the MOF,
wherein a molar ratio of cadmium salt to the magnesium salt is 1:2 to 2:1.

13. The MOF of claim 12, wherein the solvent mixture has a volumetric ratio of 15:1:1 of dimethylformamide to ethanol to water.

14. The MOF of claim 12, wherein the guanidine salt is a guanidine hydrochloride.

* * * * *